July 14, 1964 P. C. KEITH 3,140,940
IRON OXIDE REDUCTION WITH HYDROGEN
Original Filed Jan. 14, 1953
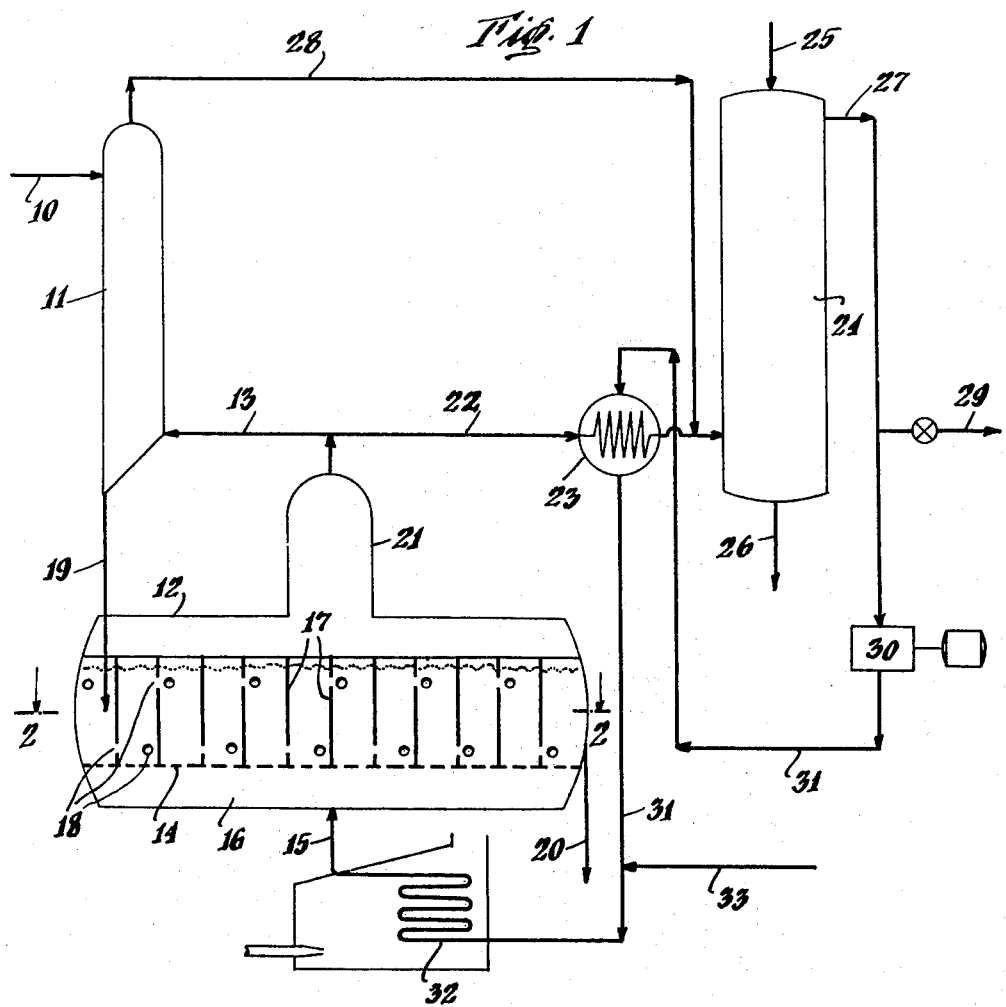
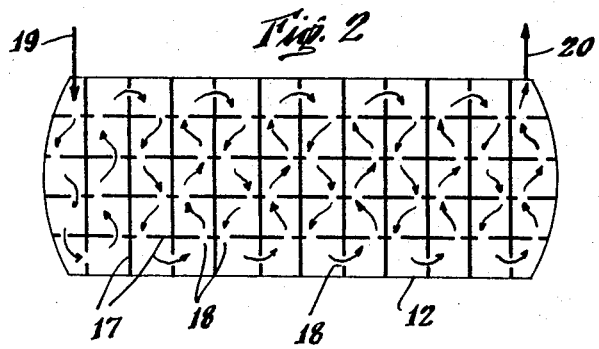
INVENTORS
PERCIVAL C. KEITH
BY
Paul W. Garbo
AGENT

United States Patent Office 3,140,940
Patented July 14, 1964

3,140,940
IRON OXIDE REDUCTION WITH HYDROGEN
Percival C. Keith, Peapack, N.J., assignor to Hydrocarbon Research, Inc., New York, N.Y., a corporation of New Jersey
Original application Jan. 14, 1953, Ser. No. 331,142, now Patent No. 2,900,246, dated Aug. 18, 1959. Divided and this application Oct. 4, 1957, Ser. No. 688,170
12 Claims. (Cl. 75—26)

This invention relates to the reduction of iron oxide in finely divided form by intimate contact and reaction with hydrogen.

The voluminous prior art on the reduction of iron oxide includes numerous different approaches to the solution of this basic operation of the steel industry. The various proposals embrace treating the iron oxide in particle sizes ranging from fine powders to substantial briquets, using reducing agents that are solid and/or gaseous, and maintaining the iron oxide, while undergoing reduction, in a stationary bed, in a downwardly moving column, in a dispersed state in a gas or in a highly fluidized dense phase. In spite of the attention which has been given to all the chemical and physical factors which influence the reduction of iron oxide, shortcomings are well recognized in each of the processes that have been proposed to date or that are currently in commercial operation. Thus, some processes require that the iron oxide be pelleted or briquetted and this requirement obviously increases the cost of producing iron. Coke and like solid reducing agents are necessary to many processes but the supplies of such materials are limited and, in any event, are cumbersome from a handling point of view. Processes depending on the use of stationary beds or moving columns inherently have the disadvantage of pellets or briquets because pellets or briquets are essential to forming a mass containing interstices for the passage of reducing and reaction gases therethrough. Reducing systems employing a dispersion of powdered iron oxide in a suspending gas call for large reactors and costly gas-solid separators. All attempts to operate with the iron oxide in a highly fluidized condition have failed to become sufficiently attractive for commercial adoption because a fluidized mass is of uniform composition throughout whereas a composition gradient is generally desired. Some workers have recognized this drawback of fluidized masses and have proposed to overcome it by using a complicated series of vessels or a series of hearths in one vessel, each containing a fluidized mass that in composition is more reduced than the preceding mass and less reduced than the succeeding mass.

A principal object of this invention is to reduce iron oxide in finely divided form without encountering the prior disadvantages of using a gaseous dispersion of the iron oxide or an intricate series of fluidized beds thereof.

Another important object is to effect the reduction of iron oxide in the absence of solid reducing agents.

A further object is to reduce iron oxide while avoiding any substantial agglomeration or consolidation of the fine particles undergoing reduction.

These and additional objects and advantages of the invention will be apparent from the description which follows.

In accordance with this invention, finely divided iron oxide, usually an ore concentrate obtained by flotation, magnetic separation or a like concentrating process, is intimately contacted and reacted with high-purity hydrogen at temperatures in the range of about 700° to 1000° F., preferably about 850° to 950° F., and at pressures in the range of about 200 to 600 p.s.i.g. (pounds per square inch gauge), preferably about 350 to 450 p.s.i.g. For the purposes of this invention, high-purity hydrogen means hydrogen containing only small amounts of such gases as carbon monoxide and dioxide, methane, nitrogen and water vapor; more specifically, the high-purity hydrogen used in the process of this invention generally has a composite average molecular weight in the range of about 3 to 7.5, preferably less than about 5.5. Since hydrogen has a molecular weight of 2 and the aforesaid admixed gases have molecular weights varying from 16 to 44, it is obvious that the quantities of the admixed gases must be kept small to hold the composite average molecular weight below the upper limit of 7.5. In addition to the composite average molecular weight limitation, the high-purity hydrogen charged into the reactor is further restricted in that its moisture content is initially no more than is indicated in the following table.

| Maximum $H_2O$ vapor content based on $H_2$ content: | Reaction temperature, °F. |
|---|---|
| 0.5% by volume | 700 |
| 1.0% by volume | 800 |
| 1.5% by volume | 850 |
| 2.0% by volume | 900 |
| 2.5% by volume | 950 |
| 3.0% by volume | 1000 |

In short, the high-purity hydrogen supplied to a reactor operating at 1000° F. may have an initial water content which is six times the initial water content of such hydrogen fed into a reactor operating at 700° F. It is well to note that over the entire contemplated range of reaction temperature, viz., 700° to 1000° F., the initial moisture content of the high-purity hydrogen supplied to the reactor is preferably not more than about 0.4% by volume based on the volume of hydrogen in said high-purity hydrogen.

To effect the intimate contact between the finely divided iron oxide and the reduced hydrogen in accordance with this invention, the iron oxide is maintained as a layer or bed, usually not exceeding about 5 feet in depth, while the pressurized high-purity hydrogen is passed upwardly therethrough at a rate sufficient to mobilize the particles without causing the excessive agitation characteristic of fluidization. While fluidization has been often likened in appearance to a mass of boiling water, the slow, quasi-viscous movements of the particles undergoing mobilization pursuant to this invention may be more closely likened in appearance to a mass of molten lava. For the usual particle sizes and densities of the iron oxide treated by this invention, the reducing gas will generally have a superficial linear velocity of the order of 0.5 foot per second while contacting the mass of iron oxide.

A highly desirable embodiment of the process of the invention involves the reduction of iron oxide in a shallow layer by treatment with high-purity hydrogen of very limited moisture content at an elevated pressure. The specific manner in which the process variables have been integrated is apparently responsible for the success of the invention. The mobilized layer or bed of iron oxide is maintained shallow, i.e., usually not more than about 5 feet deep and generally at least 1 foot deep, because with the intimate contact achieved through particulate mobilization and the rate of reaction obtained by using hydrogen at elevated pressure, the hydrogen passing through the mobilized bed will have picked up such an amount of vaporized water of reaction by the time the gas has traversed the depth of the bed that the reducing gas is no longer satisfactorily effective for reducing iron oxide.

It is also noteworthy that by operating at pressures in the range of 200 to 600 p.s.i.g. the moisture content of the reaction gases withdrawn from the iron oxide bed is simply reduced to less than about 0.4% by volume by cooling these gases to a temperature of 100° F. or lower with water at the temperatures available in most localities. In fact, the withdrawn reaction gases may be water-washed to effect this cooling-moisture removal and simultaneously to separate fine particles that may become entrained in the gases withdrawn from the mobilized bed undergoing reduction. Reaction gases from which water of reaction has been thus removed are largely recycled for further contact with the iron oxide without any intervening treatment to change the composition of these gases. Indeed, another distinguishing aspect of the process of this invention is the high ratio of recycle gases to fresh feed or make-up gases that are passed into contact with the iron oxide, this ratio generally exceeding 30 volumes of recycle gases to 1 volume of make-up gases and frequently being in the range of 50:1 to 70:1. Regardless of the quantity of the reaction gases that may be recycled for further contact with iron oxide, after the moisture content of these gases has been decreased, preferably to not more than 0.4% by volume, it will be remembered that the mixture of recycle and make-up gases must have a composite average molecular weight of not more than 7.5. Only that proportion of the reaction gases is vented or discarded as will prevent the content of such gases as methane and nitrogen from building up to an extent that the mixed recycle and make-up gases introduced into the mobilized iron oxide bed have a composite average molecular weight exceeding 7.5. Commercially available processes for the production of hydrogen yield a gas generally containing better than 90% by volume of hydrogen and not more than about 3% by volume of the carbon oxides, principally carbon monoxide. Such a gas is advantageously utilized as the fresh feed or make-up gas.

Reference is now made to the drawings of which:

FIGURE 1 is a diagrammatic flowsheet of one illustrative embodiment of the invention; and FIGURE 2 is a horizontal section of the reducing reactor of FIGURE 1, taken along the line 2—2.

Finely divided iron oxide entering by way of line 10 is passed downwardly through preheat tower 11 against upflowing hot reaction gases passing from reducing reactor 12 through line 13. Reactor 12 is desirably a cylindrical vessel disposed with its axis horizontally and having a perforated or foraminous plate 14 to support a shallow bed of the oxide. High-purity hydrogen introduced through line 15 fills the distributing space 16 and thence passes uniformly up through all of plate 14 to mobilize the layer of iron oxide thereon.

Pursuant to Section 112 of the Patent Act of 1952, I now set forth the best mode contemplated by me of carrying out my invention. For this purpose, as disclosed and claimed in my joint copending application with Herman N. Woebcke, Serial No. 331,142, filed January 14, 1953, now U.S. Patent 2,900,246, granted August 18, 1959, vertical surfaces 17 partition the oxide layer into a plurality of small portions, each having an equivalent radius in the range of about 1 to 6 inches, preferably about 2 to 3 inches. The partitioned portions of the iron oxide layer are arranged in a communicating series having flow access from one portion to the next through perforations or slits 18 in the vertical surfaces 17. As shown in FIGURE 2, the preheated iron oxide leaving tower 11 through line 19 enters the first partitioned portion of the mobilized bed in reactor 12 and progresses in zigzag fashion through the series of partitioned portions by way of the perforations 18 in vertical surfaces 17 until it reaches the final partitioned portion in a substantially reduced state whence the reduced material is withdrawn through line 20. However, when the partitioning of the aforesaid patent is not employed, my reduction zone and the bed of iron oxide particles therein are unobstructed.

The reaction gases leaving dome 21 of reactor 12 are in part passed through line 13 as aforesaid and in part through line 22 and heat exchanger 23 into wash tower 24. Scrubbing water is supplied by line 25 and drained through line 26. The cooled, washed gases leave tower 24 through line 27. The portion of the reaction gases which flows out of tower 11 by way of line 28 may be added to the other portion entering wash tower 24. The total reaction gases minus the water of reaction eliminated in wash tower 24 and minus the small proportion of the gases discarded through valved vent line 29 to prevent the build-up of the content of gases like nitrogen and methane are drawn into compressor 30 which raises the pressure sufficiently to compensate for the pressure losses the reaction gases had in passing through the plant. The recompressed gases are recycled to reactor 12 after passing through line 31, heat exchanger 23, and heater 32. Fresh hydrogen is added as make-up to the recycled gases by way of line 33.

In a specific example, finely divided hematite is charged to preheat tower 11 at the rate of 800 tons per day whence it discharges at a temperature approaching 800° F. and then enters reactor 12. High-purity hydrogen (composite average molecular weight of 5.4) with a water vapor content of about 0.3% by volume, based on the volume of hydrogen in said high-purity hydrogen, is charged through line 15 at a pressure of 400 p.s.i.g. and with sufficient preheat to maintain the layer of solids on plate 14 at a temperature of about 850° F. The gas passes up through the layer of solids with a superficial linear velocity of about 0.4 foot per second thereby effecting mobilization and reduction of the oxide particles. The layer is about 3 feet deep and the reaction gases emerge from the top thereof with a moisture content of about 2% by volume. After passing through wash tower 24, these gases at a temperature of 100° F. contain only about 0.25% by volume of water vapor; a small proportion of these gases is vented through line 29. Fresh hydrogen (analysis on volume basis: 94.7% $H_2$, 3% CO, 0.1% $CO_2$, 0.4% $CH_4$, 0.3% $H_2O$, 1.5% $N_2$, A, etc.) is added to the recycled reaction gases at the rate of nearly 15 mmscfd (million standard cubic feet per day). The volume ratio of recycled gases to fresh make-up gas is approximately 50:1. The partitioned portions of the mobilized bed in reactor 12 have an equivalent radius of 2 inches (the expression, equivalent radius of 2 inches, is used to connote that the particles in the mobilized bed which are farthest from any vertical surface are not more than 2 inches away from any such surface). The material withdrawn through line 20, on analysis, shows that more than 90% by weight of the hematite has been completely reduced to iron.

This application is a division of my joint copending application with Herman N. Woebcke, Serial No. 331,-142, filed January 14, 1953.

In view of the various modifications of the invention which will occur to those skilled in the art upon consideration of the foregoing disclosure without departing from the spirit or scope thereof, only such limitations should be imposed as are indicated by the appended claims.

What is claimed is:

1. A process for effecting reduction of iron oxide to metallic iron, which comprises passing hydrogen of at least 90 percent purity through a body of said iron oxide in finely divided particle form in an unobstructed reduction zone at a temperature between 700 and 1000° F. and at a pressure of the order of hundreds of pounds per square inch gauge not exceeding about 600 pounds per square inch gauge, the linear velocity of said hydrogen through said body of iron oxide particles being such that said body is maintained in a fluid state with minimum carryover of solids, withdrawing an effluent gas from said reduction zone, removing water from said effluent gas to such an extent that upon recycling said effluent gas together with fresh feed hydrogen as hereinafter recited the composite gas will have a maximum water content not exceeding about 3% by volume of the hydrogen content of said composite gas, recompressing said effluent gas to a pressure of at least 200 pounds per square inch gauge, maintaining a substantially equivalent pressure within the reduction zone except for the pressure difference necessary to produce the required flow through the system, heating said repressured effluent gas to a temperature above that maintained in said reduction zone, adding fresh feed hydrogen of at least 90 percent purity to said effluent gas in an amount to form said composite gas having a ratio of several volumes of said effluent gas to each volume of said fresh feed hydrogen, passing said composite gas into said reduction zone to thereby overcome the temperature and pressure drops occurring in the reduction and water removal steps and maintain said temperature and pressure in said reduction zone, and withdrawing a reaction product containing metallic iron from said reduction zone.

2. A process according to claim 1 in which the water content of the composite gas does not exceed about 0.4% by volume of the hydrogen content of said composite gas.

3. A process according to claim 1 in which the temperature is maintained between 850 and 1,000° F.

4. A process according to claim 1 in which the recompression pressure is between 350 and 450 p.s.i.g.

5. The method of reducing particles of oxygen bearing metal containing material to metallic form with high-purity hydrogen having a maximum water content not exceeding about 3% by volume of the hydrogen content of said high-purity hydrogen, comprising: forming with said particles a gas permeable unobstructed bed having voids and of a shallow depth defined by gas entry and exit surfaces thereof; isolating said bed from the atmosphere; heating said isolated bed to a reducing temperature less than that sufficient to substantially close the voids thereof due to melting of said particles; regeneratively passing said high-purity hydrogen through said bed from the entry to the exit surfaces thereof; and removing reducing reaction products from hydrogen at a rate corresponding to the rate of formation of said products during passage of said hydrogen through said bed.

6. The method of reducing particles of oxygen bearing metal containing material with high-purity hydrogen having a maximum water content not exceeding about 3% by volume of the hydrogen content of said high-purity hydrogen, comprising: forming with said particles a gas permeable unobstructed bed having voids and of a shallow depth defined by gas entry and exit surfaces thereof; heating said bed to a reducing temperature less than that sufficient to substantially close the voids of said bed due to melting of said particles; passing said high-purity hydrogen through said heated bed substantially from the gas entry surface thereof to the gas exit surface thereof, at a velocity through said bed sufficient to limit the amount of reducing reaction products formed per unit volume of hydrogen to a predetermined relatively low value.

7. The method of reducing particles of oxygen bearing metal containnig material with high-purity hydrogen having a maximum water content not exceeding about 3% by volume of the hydrogen content of said high-purity hydrogen, comprising: forming with said particles a gas permeable unobstructed bed having voids and of a shallow depth defined by gas entry and exit surfaces thereof; heating said bed to a reducing temperature less than that sufficient to substantially seal the voids of said bed due to melting of said particles; passing said high-purity hydrogen through said heated bed substantially from the gas entry surface thereof to the gas exit surface thereof, at a velocity through said bed sufficient to limit the amount of reducing reaction products formed per unit volume of hydrogen to a predetermined relatively low value; and removing said reaction products from said hydrogen after the latter has left the exit surface of said bed.

8. The method of uniformly reducing oxygen bearing metal containing material with high-purity hydrogen having a maximum water content not exceeding about 3% by volume of the hydrogen content of said high-purity hydrogen, comprising: preparing said material to relatively fine particle size; forming from said prepared material an uncompacted shallow unobstructed bed of a depth defined by entry and exit surfaces of said bed; heating said bed to a reducing temperature less than that sufficient to unduly constrict the voids between the particles of said bed due to melting; passing said high-purity hydrogen through said heated bed substantially from the entry surface thereof to the exit surface thereof, at a velocity through said bed sufficient to limit the amount of reducing reaction products formed per unit volume of hydrogen to a predetermined relatively low value; generating a fresh source of said high-purity hydrogen; recirculating said hydrogen after the latter has left the exit surface of said bed with said high-purity hydrogen from said fresh source through said bed; and removing a portion of the reducing reaction products from said hydrogen at a rate sufficient to correspond to the rate of formation of said products during passage of said hydrogen through said bed.

9. In the method of reducing an oxygen bearing metal containing material with high-purity hydrogen having a maximum water content not exceeding about 3% by volume of the hydrogen content of said high-purity hydrogen, the steps of: forming a shallow unobstructed bed of particles of said material; passing said high-purity hydrogen through said bed; and proportioning the depth of said bed in conjunction with the rate of hydrogen flow therethrough to limit the time of contact of a unit volume of said hydrogen with said bed to create a minimum of reducing reaction products per unit volume of said hydrogen during passage through said bed.

10. The method of reducing particles of oxygen bearing metal containing material with high-purity hydrogen having a maximum water content not exceeding about 3% by volume of the hydrogen content of said high-purity hydrogen, comprising: forming with said particles a gas permeable unobstructed bed having voids and of a shallow depth defined by gas entry and exit surfaces thereof; heating said bed to a reducing temperature less than that sufficient to substantially close the voids of said bed due to melting of said particles; passing said high-purity hydrogen through said heated bed substantially from the gas entry surface thereof to the gas exit surface thereof, at a velocity through said bed sufficient to limit the amount of reducing reaction products formed per unit volume of hydrogen to a predetermined relatively low value; and removing said reaction products from said hydrogen after the latter has left the exit surface of said bed; and recirculating the remainder of said hydrogen through said bed.

11. The method of reducing particles of oxygen bearing metal containing material with high-purity hydrogen having a maximum water content not exceeding about 3% by volume of the hydrogen content of said high-purity hydrogen, comprising: forming with said particles a gas permeable unobstructed bed having voids and of a shallow depth defined by gas entry and exit surfaces thereof; heating said bed to a reducing temperature less than that sufficient to substantially constrict the voids of said bed due to melting of said particles; passing said high-purity hydrogen through said heated bed substantially from the gas entry surface thereof to the gas exit surface thereof, at a velocity through said bed sufficient to limit the amount of reducing reaction products formed per unit volume of hydrogen to a predetermined relatively low value; generating a fresh source of said high-purity hydrogen; recirculating said hydrogen after the latter has left the exit surface of said bed with said high-purity hydrogen from said fresh source through said bed; and removing a portion of the reducing reaction products from said hydrogen leaving the exit surface of said bed.

12. A process for effecting reduction of iron oxide to metallic iron, which comprises passing hydrogen of at least 90 percent purity upwardly through a body of said iron oxide in finely divided particle form in an unobstructed reduction zone at a temperature between 700 and 1000° F. and at a pressure in the range of 200 to 600 pounds per square inch gauge, withdrawing an effluent gas from said reduction zone, removing water from said effluent gas to such an extent that upon recycling said effluent gas together with fresh feed hydrogen as hereinafter recited the composite gas will have a maximum water content related to the reduction temperature such that said water content does not exceed about 0.5% by volume of the hydrogen content of said composite gas at a reduction temperature of 700° F. and does not exceed about 3% by volume of the hydrogen content of said composite gas at a reduction temperature of 1000° F., recompressing said effluent gas to a pressure of at least 200 pounds per square inch gauge, heating said repressured effluent gas to a temperature above that maintained in said reduction zone, adding fresh feed hydrogen of at least 90 percent purity to said effluent gas in an amount to form said composite gas having a ratio of several volumes of said effluent gas to each volume of said fresh feed hydrogen, passing said composite gas into said reduction zone with a superficial linear velocity through said body of iron oxide of the order of 0.5 foot per second such that said body is maintained in a fluid state with minor carryover of solids, and withdrawing a reaction product containing metallic iron from said reduction zone.

References Cited in the file of this patent
UNITED STATES PATENTS

| | | |
|---|---|---|
| 2,389,133 | Brassert et al. | Nov. 20, 1945 |
| 2,479,435 | Vesterdal | Aug. 16, 1949 |
| 2,481,217 | Hemminger | Sept. 6, 1949 |
| 2,671,765 | McGrath et al. | Mar. 9, 1954 |
| 2,790,710 | Cavanagh | Apr. 30, 1957 |
| 2,900,246 | Keith et al. | Aug. 18, 1959 |